Sept. 24, 1929.  T. M. STEWART  1,729,298
STERILIZING THERMOMETER
Filed May 14, 1927
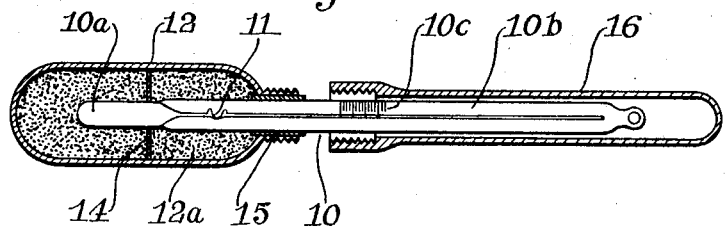
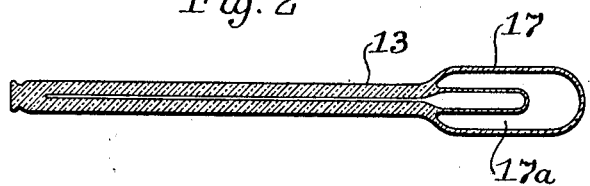
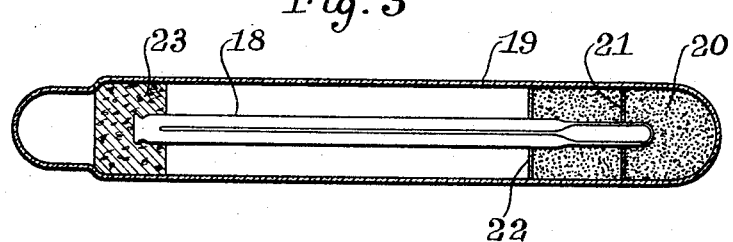
INVENTOR:
Thomas M. Stewart
BY
his ATTORNEY Patented Sept. 24, 1929

1,729,298

UNITED STATES PATENT OFFICE

THOMAS M. STEWART, OF ROCHESTER, NEW YORK, ASSIGNOR TO TAYLOR INSTRUMENT COMPANIES, OF ROCHESTER, NEW YORK, A CORPORATION OF NEW YORK

STERILIZING THERMOMETER

Application filed May 14, 1927. Serial No. 191,346.

This invention relates to thermometers and more in particular to a thermometer for indicating whether a certain temperature condition has prevailed at a certain place for a certain minimum period of time.

In hospitals and other places where sterilization is of the greatest importance and must be carried out with the utmost care, it was heretofore the practice to use the so-called Diack control to make sure that a definite minimum sterilizing temperature had been in force for a definite minimum period. This control involves the application of a pellet of a material which melts at the particular sterilizing temperature and is of such a size that the transition to the molten condition requires the lapse of the particular critical period of time. If the critical temperature was effective for the required period of time, this fact is reliably indicated by the physical condition of the molten mass of the pellet. The latter is contained in a small glass tube and placed wherever the temperature is to be investigated.

While the control just described is entirely satisfactory and reliable, it has the drawback from a commercial and practical point of view that the testing device, i. e., the tube with the pellet can be used only once and becomes absolutely useless as the result of the single use.

The present invention has for its object to provide a thermometer specially adapted to give the indication heretofore given by the Diack control above referred to, i. e., to indicate whether a certain critical temperature has been effective for a definite minimum period of time.

For a full understanding of the invention, its characteristic features, its application and its advantages, reference is made to the accompanying drawings wherein, Fig. 1 is a longitudinal cross-section of a device constituting what I at present consider as the preferred embodiment of the invention;

Fig. 2 is a similar section of a modification thereof;

And Fig. 3 is a similar section of a slightly different form of the invention.

In Fig. 1, 10 represents a thermometer of usual construction including the bulb $10^a$ and the stem $10^b$ provided with scale $10^c$ which may be limited, of course, to a single mark corresponding to the critical temperature in question. The thermometer is preferably provided with a constriction 11 characteristic of maximum registering thermometers.

The bulb $10^a$ is enclosed in a bulbular form of casing 12 preferably of thin pressed sheet metal of a non-corrosive alloy. The interspace $12^a$ represents a heat-insulating zone in the form of a vacuum, dry air or other suitable gas or preferably heat insulating material such as cork, finely divided asbestos, lamp black, glass wool, magnesia powder or other suitable materials known on the market as bakelite, sil-o-cel powder, calowox, insulex and celite.

As a practical expedient for facilitating assembling of the bulb in the casing 12, I use a thin disk 14 of some rigid heat insulating material.

The casing 12 may be permanently fixed in place by joining it to a layer 15 of metal electrolytically deposited on the stem $10^b$. For convenience in assembly, the casing 12 may be made in two axially adjoining parts to be soldered together in circumferential direction.

The exposed glass stem $10^b$ of the thermometer may be protected against breakage by means of a cap 16 having screw connection with the upper portion of the casing 12.

In Fig. 2, 17 represents a bulbular glass cover of appropriate size integral with the body of the thermometer 13 and the interspace $17^a$ may be exhausted or filled with air or other gas.

In Fig. 3, the thermometer 18 is entirely surrounded by a glass cover 19 forming a holder for the insulating material 20 and protecting the stem. If the material is loosely contained or mobile, a centering spacer 21 of insulating material and a confining partition 22 of cement or the like may be used to hold the insulating material in place. At the upper end a centering body 23 of cork, bakelite or other suitable material may be disposed to receive the stem 18.

The operation is as follows:

The instrument just described is placed into the center of a package or bundle of goods to be sterilized in a sterilizer or the like. The heat, usually in the form of steam, is then applied and kept at a substantially constant temperature, for instance by maintaining the steam under a substantially constant pressure corresponding to the desired temperature. When the steam penetrates into the interior of the package and reaches the casing 12 of the thermometer, it will require a definite lapse of time, say 5 minutes, until the thermometer will indicate the temperature at the center of the package. When the thermometer is taken out of the bundle or package, either directly after sterilization or at a later time, the thermometer reading will indicate whether the critical temperature was maintained for the critical period of time or not. It should be understood, of course, that the reading of the thermometer, although the latter is a maximum-registering device, after a relatively long delay, calls for a slight correction, which factor can be easily kept in mind and is in practice automatically taken care of.

In all the forms of the invention, the heat reaching the bulb passes through a definitely limited completely and permanently sealed interspace. Dissipation of heat due to fortuitous heat exchange by conduction and convection is practically avoided. The heat is uniformly transmitted through the heat-insulating zone and made uniformly effective at the bulb. The indication of the thermometer is therefore absolutely reliable.

The thermometer can be used continuously as there is no time limit to its usefulness.

I claim:

1. A sterilizing thermometer including a bulb, a casing surrounding the bulb, a disk of heat-insulating material for centering the bulb relatively to the casing and mobile heat insulating material filling the interspace defined by the bulb and the casing, the casing extending only a short distance beyond the opposite ends of the bulb.

2. A sterilizing thermometer comprising a stem and a bulb and a casing surrounding the bulb, said casing being spaced from the bulb to define a space around the same and being completely and permanently sealed to prevent fluid communication between the said space and the atmosphere.

3. A sterilizing thermometer comprising a stem and a bulb, and a casing surrounding the bulb and the adjoining portion of the stem, said casing being spaced from the bulb to define a space around the same and being completely and permanently sealed to prevent fluid communication between the said space and the atmosphere.

4. A sterilizing thermometer comprising a stem and a bulb, and a casing surrounding the bulb, said casing being spaced from the bulb to define a space around the same and being completely and permanently sealed to prevent fluid communication between the said space and the atmosphere, and a medium occupying said space, said medium having a heat conductive capacity materially smaller than the atmosphere surrounding the envelope.

In testimony whereof I affix my signature.

THOMAS M. STEWART.